US006569510B1

(12) United States Patent
Menon et al.

(10) Patent No.: US 6,569,510 B1
(45) Date of Patent: May 27, 2003

(54) RETRO-FLECTIVE SHEETING ON METAL COIL COMPOSITES

(76) Inventors: Hari Menon, 307 Willards Way, Yorktown, VA (US) 23269; William Korman, 3029 Lincoln Ave., Richmond, VA (US) 23228

( * ) Notice: Subject to any disclaimer, the term of this patent is extended or adjusted under 35 U.S.C. 154(b) by 0 days.

(21) Appl. No.: 09/562,006

(22) Filed: May 2, 2000

(51) Int. Cl.[7] .............................................. B32B 15/08
(52) U.S. Cl. ...................... 428/156; 428/615; 428/635; 359/883; 359/900
(58) Field of Search ............................ 428/156, 912.2, 428/615, 635; 359/883, 900

(56) References Cited

U.S. PATENT DOCUMENTS 3,681,179 A * 8/1972 Theissen ..................... 428/336
3,776,805 A * 12/1973 Hansen ........................ 428/174
5,337,179 A * 8/1994 Hodges ........................ 359/443
5,366,803 A * 11/1994 Nakazawa et al. .......... 428/335

OTHER PUBLICATIONS

Copy of DOT Report dated Feb. 17, 2000.

* cited by examiner

*Primary Examiner*—Harold Pyon
*Assistant Examiner*—Alicia Chevalier
(74) *Attorney, Agent, or Firm*—Oblon, Spivak, McClelland, Maier & Neustadt, P.C.

(57) ABSTRACT

A retroflective laminated composite metal product and process for preparing reflective information markers in use where high volume traffic or construction areas require signage is provided, wherein the product exhibits excellent adhesion bonding characteristics between the aluminum surface and the adhesion backed retroflective surface, provides high rigidity and ease of fabrication while still passing the requirements of NCHRP 350.

28 Claims, 2 Drawing Sheets

RETRO-FLECTIVE SHEETING ON METAL COIL COMPOSITES

BACKGROUND OF THE INVENTION

1. Field of the Invention

The present invention relates to metal coil composites having one of more retroflective surfaces and their use in providing temporary traffic signs and fascia display patterns for outdoor use.

2. Discussion of the Background

Various composite laminates are known wherein a metal sheet is laminated with a thermoplastic synthetic resin sheet. U.S. Pat. No 4,508,425 discloses a mirror-like surface manufactured by plating chromium on one surface of a metal sheet bonded to a composite sheet, made up of a synthetic resin sheet and the metal sheet, to form the mirror surface. The mirrored finish sheet may be worked to a desired shape and may be formed with a decorative pattern.

U.S. Pat. No. .4,560,623 discloses a specular product of a bronze-like tone particularly suitable for use as a decorative material. The specular product uses, as a substrate, a composite board comprising a synthetic resin sheet and metal sheets laminated thereon, and includes a nickel deposit plated on the metal sheet and a specular film of Sn-Ni alloy electroplated on the nickel deposit using a specific electroplating bath.

Such composites are useful for a number of architectural applications, because the composites combine light weight with high strength. These composites may be used as finished surfaces for all or some portion of the interior or exterior surfaces of a building.

In 1991, the Intermodal Surface Transportation Efficiency Action was passed, requiring the U.S. Secretary of Transportation to institute measures to enhance the crashworthy performance of roadside features, such as traffic signs. This prompted the adoption in 1993 of National Highway Research Program Report,350 (NCHRP Report 350) containing recommended procedures for safety performance evaluation of these highway features. All new or replacement features used on the National Highway System must be tested and pass the guidelines of NCHRP 350.

NCHRP 350 contains guidelines for four categories of highway features. Work zone features such as portable signage and stand assemblies are classified as Category 2 devices. The general test for Category 2 devices requires crash testing an 820 kg vehicle into two devices, one head on to the vehicle and the second turned at a 90° angle to the first and spaced 6 meters apart. The vehicle must strike this configuration at 100 km/h, with the event being recorded by still photography and film on video. In order to pass the test, the Category 2 device cannot penetrate or seriously deform the occupant compartment and cannot damage the windshield to the vehicle. That visibility is significantly impaired.

Current and temporary work zone signs are made from sheets of aluminum. Unfortunately, such aluminum signs have not been able to pass this crash test at normal operating heights for portable work zone signs. As a result, the industry has switched to lightweight roll-up signs to pass the NCHRP requirements. However, there is a severe compromise in the use of such signs. The roll-up signs are not rigid enough and are more difficult to fabricate than the conventional rigid aluminum signs.

SUMMARY OF THE PRESENT INVENTION

Accordingly, one object of the present invention is to provide a material for, highway signage that has the required rigidity for long lifetimes and is easy to fabricate using conventional fabrication methods in the highway sign industries while also being able to pass the NCHRP 350 standard.

A further object of the present invention is to provide a metal-resin composite having a retroflective surface typically used in highway signage in construction work zones.

A further object of the present invention is to provide a highway sign, preferably portable, having high rigidity and ease of fabrication while still passing the NCHRP 350 standard.

It is another objection of the present invention to provide a method for preparing a retroflective sheeted composite metal plate or composite, which may be bent to a sharp angle without cracking of the sheeting.

These and other objects of the present invention have been satisfied by the discovery of a metal-resin composite laminated metal sheet comprising:

a resin sheet; and at least one retroflective surfaced metal sheet laminated onto a surface of said resin sheet; wherein said retroflective surfaced metal sheet comprises;

a metal substrate having an interior and exterior surface with said interior surface adhered to said resin sheet; and a retroflective sheeting adhered to said exterior surface of said metal substrate by a layer of adhesive, and its use in the construction of signs, particularly highway signs for temporary or permanent use.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
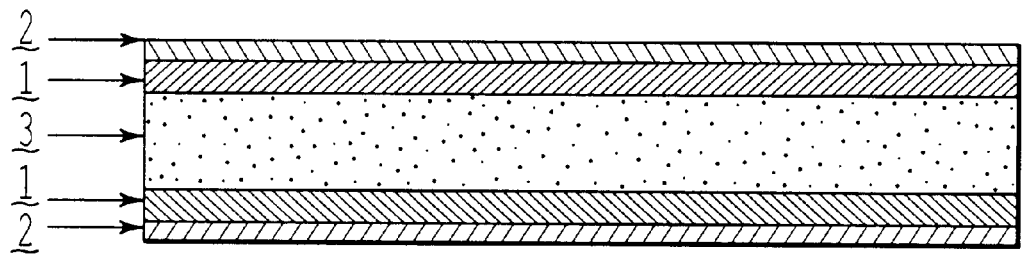
FIG. 1 provides a cross-sectional side view of the finished laminated retroflective sheeted metal composite of the present invention.

The present invention relates to a metal-resin composite laminate that includes the use of a retro-flective sheeting typically used for signage in construction work zone areas along streets and highways. The present metal-resin composite laminate also exhibits good weathering resistance with regard to temperature and humidity changes experienced during outside exposure and capable of bending to a sharp angle without cracking of the laminate on the exposed exterior surface of the metal. The composite is capable of being cut to specified lengths, curved, routed, sawn, filed, drilled, punched or sheared and fastened in order to complete fabrication of the desired item which is often in the form of a sign or information marker and is preferably attached to a stand, most preferably a portable stand.

The present invention laminated coated metal sheet having the retro-flective sheeting exhibits excellent resistance to cracking, stress crazing, delamination, impact, and the like during fabrication and testing of the information markers used for work zone signing and other applications. The present invention also relates to a method to prepare such metal sheets and resultant composite laminates.

The present invention metal composites having exterior surfaces that are retro-flective, are preferably prepared by laminating both sides of an aluminum composite surface (that is either coated with a polyester based paint or uncoated) with an adhesive backed retro-flective sheeting. Preferably, for highway usage the retroflective sheeting has a diamond-shaped pattern on its surface. This process requires heat and pressure to obtain the desired adhesion between the laminate and the aluminum surface(s) of the composite.

The adhesive backed retro-flective sheeting must be adhered sufficiently to permit post-pattern forming, molding, bending, shaping, punching, and shearing of the metal into suitable parts, especially for use as components of composite signage panels, without the pattern delaminating or flaking from the substrate. The surface patterns are also resistant to hazing, clouding, flaking, and delamination under conditions of use where the coated metal is exposed to the harmful effects of ultraviolet light and other environmental factors such as heat, humidity, ozone, smog, etc.

It has been known for sometime how to prepare colored articles from non-sealed anodized aluminum alloys in a form such as foil, sheet and containers by a thermal printing method as described in U.S. Pat. No. 4,177,299 issued Dec. 4, 1979 and herein incorporated by reference. More generally, methods have been described for decorative surface coatings of flat substrates using transfer sheets that are pressed on the substrate at elevated temperatures as included in U.S. Pat. No. 5,019,198 also incorporated herein by reference. The pressing of the transfer sheet against the substrate is carried out with a press tool devoid of surface patterns and having a generally flat press surface.

The coil coatings and industrial coatings industries, for a number of years, have successfully coated unsealed, non-anodized and anodized metal substrates which have been anodized or etched by an electrochemical process employing sulfuric acid, chromic acid, phosphoric acid, or oxalic acid electrolytes. Such unsealed, non-anodized or anodized metal substrates provide an excellent base for adhesion of a paint, enamel or lacquer coating because of the surface porosity of the non-anodized or anodized metal surfaces. They also provide an excellent surface for a heat sensitive adhesive such as is employed for the "bottomside" surface of the retro-flective sheets of the present invention.

Sealing of the anodized metal substrate can substantially reduce the abrasion resistance thereof. When anodized metal substrates have been sealed, it is very difficult for paint or a coating to adhere to the surface of the sealed, anodized metal substrate.

The present invention provides a system for lamination of a heat sensitive or pressure sensitive adhesive backed retro-flective sheet onto metal composite substrates. The retro-flective sheets on the composite surface(s) are primarily intended for use with information markers or signage that is often used in construction and/or high traffic volume areas along streets and highways. Both standard and custom designs are possible based on the need and availability of the retro-flective sheeting.

In accordance with this method, coated metal sheets are laminated with heat and pressure. In order to achieve the lamination the coiled aluminum plate composite is treated with a primer (such as Valspar PMW 0632) on one or optionally both pre-etched aluminum surfaces with a polyester coating or paint, preferably Valspar PMW 1494 over either an 0.10"–0.020"aluminum alloy 5052 (hardness H32) skin that contains a sandwiched polyethylene composite. Such base structures (minus the retroflective layer) are described in U.S. Patent 5,366,803, hereby incorporated by reference. A two-sided retroflective sheet preferably with a diamond shaped adhesive paper or film on the bottom side and the reflective surface on the top side is used to complete the preferred product. The diamond shaped adhesive is normally epoxy based and is activated when heated and/or pressurized and mobilized for bonding to the polyester coated (or optionally uncoated) aluminum substrate. The bottom side of the retroflective sheet includes a thermally activated adhesive, preferably in a diamond shaped mesh pattern, that is specially formulated to be compatible with the polyester coating or with the bare aluminum surface. The need for priming the Valspar coated aluminum surface is based on existing thermal and pressure conditions and the level of adhesion, mar resistance, crazing, and crack resistance desired for the final laminated product. Initial testing has indicated that the adhesion between the composite surfaces and the retroflective sheeting is best without the Valspar coating.

A preferred process includes a continuous rolling system with an unwinder spool for the initially coiled aluminum plate composite followed by a pre-heater through which the aluminum plate composite is transferred during unwinding. In a most preferred embodiment the coiled aluminum plate composite has a protective film that is removed during the uncoiling process. The surface of the aluminum composite is then preferably cleaned with a 50% by weight aqueous solution of isopropyl alcohol, then air dried. The adhesive backing of the retroflective sheeting is then exposed by peeling back (either manually or mechanically) the protective paper covering from the epoxy coated adhesive portion. Next, the aluminum composite is fed through a series of (optionally heated) rollers that simultaneously feed the aluminum composite and the retroflective sheeting toward a final take-up spool. During this portion of the operation, the adhesive bottomside portion of the retroflective sheeting is adhered to the surface of the Valspar treated (or untreated) aluminum and the remaining, transparent, pigment-less carrier film is recoiled onto a separate take-up spool. The carrier film is also a thermoplastic, preferably a polyester or heat resistant polyolefin.

Temperature and pressures are controlled as needed to ensure adhesion levels are sufficient between the primed Valspar treated aluminum surface (or bare aluminum surface) and the retroflective sheeting. Preferably, the pressure of the rollers is adjusted by the distance of separation of the rollers and is most preferably controlled to about 80 psig. This pressure is controlled by use of a compressor and regulator which regulates the pressure used to "squeeze" the rollers together. Most preferably, the top roller moves towards the bottom roller, with the bottom roller remaining stationary. The epoxy adhesive most preferred is a pressure activated adhesive. However, thermally activated adhesives can also be used with heated roller systems. Suitable adhesives can be obtained from 3M and Avery-Dennison, among other sources. The temperature of the rollers must be sufficient to provide a surface temperature of the reflective sheeting of from 140 to 150 F. This can be accomplished using a roller temperature of from 175 to 250 F., depending on the other process conditions, such as throughput speed.

The retroflective sheeting of the present invention can be applied to the aluminum composite either pre-fabrication into the desired shape and size, or post fabrication into the desired shape and size.

The retroflective sheeting of the present invention must allow post-coating fabrication of the coated metal into suitable parts of elements, particularly parts of elements for use with exterior signage and displays, information markers, traffic signage, etc..

This invention provides a system for lamination of retroflective surfaces for informative images onto metal substrates. In accordance with this method, coated metal sheets or metal-resin composites are laminated by heat and/or pressure. A preferred method includes a continuous rolling system with an unwinder spool for the initially coiled thermosetting polyester coated or bare aluminum-resin plate composite followed by a pre- heater that is a stationary convection oven through which the aluminum-resin plate composite is transferred during unwinding. The initial pass allows for transfer of a diamond adhesive shaped bottom on the bottom surface of the retroflective sheet via heating of the bottom-side using a series of heated rollers. The adhesive backed retroflective sheet and two-sided metal composite are fed directly through a roll-on laminator or hot stamping machine (after the pre- heating step) using an appropriate stamping pressure. The (optionally polyester coated) aluminum resin-composite is fed through a series of (optionally heated) rollers that simultaneously feed the aluminum composite and the retroflective sheet toward a final take- up spool. Transfer of the desired retroflective sheet to the surface(s) of the metal composite is normally accomplished at a take-up speed of 1–3 meters/minute, preferably 2–3 meters/minute. For throughput considerations, the higher take-up speeds are preferred. Upon completion of the retroflective surface onto the metal-resin composite, the composite is subsequently protected for transport with a clear, adhesive backed thermoplastic film.

In a preferred embodiment, the present product relates to a laminated metal plate comprising; a metal substrate; optionally an adhesive primer between the metal substrate and a layer of cured, thermosetting polymer; said layer of cured, thermosetting polymer prepared by heat curing a polymer resin comprising a curing agent coated onto a primed metal substrate; a retroflective surface adhered to the (optionally) cured thermoset polymer surface.

The metal plate may be formed of any of various metals such as aluminum, iron, copper, tin, steel, and the like. Aluminum and iron are preferred, and aluminum is particularly preferred. Although there is no particular constraint on the thickness of the metal plate, if the coated metal plate is to be used as a component in a composite laminate, it is preferred that the plate have a thickness of 0.2 mm–1.5 mm, most preferably 0.25 mm to 0.5 mm, most preferably 0.25 mm. The conventional Alpolic product produced and sold by Mitsubishi Chemical America uses aluminum plate having a thickness of 0.5 mm.

In a second embodiment regarding the inventive process, the metal sheet, in particular aluminum sheet, is uncoiled and first coated with a primer (such as PMW 0632) with a dried film thickness of 0.0004–0.0006"and then a layer of Valspar PMW 1494, with a dried film thickness of 0.0095–0.001"that is subsequently heat cured at a peak mean temperature (PMT) of 450° F. (as measured at the aluminum surface, actual oven temperatures can be higher) to ensure proper crosslinking and thermoset properties. A next step in the process includes priming with adhesive by use of an adhesive backed carrier film onto one or more of the surfaces. A suitable adhesive backed carrier film can be obtained from Bemis Corporation of Boston, Mass. If the metal sheet is to be used in a laminate with a resin core such as a polyolefin, then the surface of the metal sheet to be bonded to the resin core is preferably coated with a layer of thermosetting polyester. Good results have been achieved using a pigmented thermosetting polyester paint marketed under the tradename of Valspar PMW 1494. Best results for lamination and adhesion with the retroflective sheet have been obtained with the bare metal surfaces of the metal composite.

Coating compositions for coating metal coils are often subjected to elevated temperatures during warehousing and shipping and especially during storage at coil coating plants where temperatures of about 120° to 140° F. (49° to 60° C.) may be encountered. These elevated temperature conditions can lead to delamination of laminated retroflective sheets or cracking and peeling of the retroflective surfaces for said compositions.

The resin core of the composites may be composed of any resin suitable for use in metal resin laminate plates. Such resins are described in U.S. Pat. No. 4,994,130, which is incorporated herein by reference. It includes, for example, polyethylene, polypropylene, polybutane, polyvinyl chloride, polystyrene, polyamide, polyethylene terephthalate, polybutylene terephthalate and polycarbonate. From the viewpoint of the extrusion molding properties, it is preferred to employ a polyolefin synthetic resin such as polyethylene, polypropylene, or polybutene. As such a thermoplastic resin, not only a virgin material, but also a recovered material or reproduced material may be used in the form of a sheet. To such a thermoplastic resin, a foaming agent,. a flame retardant, a filler, a coloring agent, etc. may be incorporated as the case requires. Good results have been achieved by using a low density polyethylene core.

It is particularly preferred that the metal sheet(s) be laminated with the resin core by means of an adhesive laminating film, disposed between the resin core and the metal sheet. Most preferably, the adhesive film is a modified polyolefin resin such as those described in U.S. Pat. 4,762,882, which is incorporated herein by reference.

Suitably, the resin core is 1 to 10 mm thick, preferably 2 to 5 mm thick. The adhesive film is suitably 10 to 100 $\mu$m thick, preferably 15 to 50 $\mu$m thick.

The laminate of the present invention may be prepared by extruding the resin core through a die to form a flat sheet and passing the extruded resin sheet through laminating rollers simultaneously with two metal sheets, one on each surface of the resin sheet. At least one and sometimes both of the metal sheets are coated according to the present invention. The metal sheets according to the present invention are oriented such that the Valspar coated layers face away from the resin core.

Typically, the resin core is laminated at a temperature of 110° to 190° F., preferably 125° to 165° F. It is preferred to extrude the resin sheet to a thickness which is larger than the gap between the laminating rollers by about 10%. Preferably, the coated metal sheet is preheated to a temperature of 320° to 420° F., most preferably 330° to 400° F. before passing through the laminating rollers with the resin core. The lamination is suitably carried out at a temperature of 320° to 410° F. Suitably, the laminating pressure is 250 to 1100 psi, preferably 400 to 1000 psi.

The retroflective layer can be prepared using any retroflective sheet capable of being adhered to the coated or uncoated metal surface. The retroflective sheet may be adhered to the metal by adhesive supplied on the sheet or by a separate adhesive applied directly to the metal or to the retroflective sheet in a separate step.

In a preferred embodiment, the coated metal plate is laminated to the resin core by an adhesive film. In this case, a multilayered arrangement, in which the adhesive film is disposed between the metal sheet and the resin core, is forced through the laminating rollers.

Referring now to the drawings, wherein like reference numerals designate identical or corresponding parts throughout the several views;

FIG. 1 shows a cross-sectional view of a retroflective composite metal plate according to the present invention. The metal substrate (1) which is optionally coated with a cured layer of thermosetting polyester and then subsequently laminated with an adhesive backed retroflective paper or film (2) to produce a reflective finish suitable for outdoor displays, specifically for signage that meets the NCHRP-350 crash test. Therein core (3) is sandwiched between two coated metal sheets according to the present invention each of which comprise a metal substrate (1) and a cured bottomside of the topside reflective sheet (2). The coated metal sheets are oriented such that the reflective surfaces (2) face away from the resin core (3). Although the embodiment shown has two laminated metal sheets of the present invention, it is to be understood that other embodiments will employ only one of the present coated laminated sheets.

Figure 2:
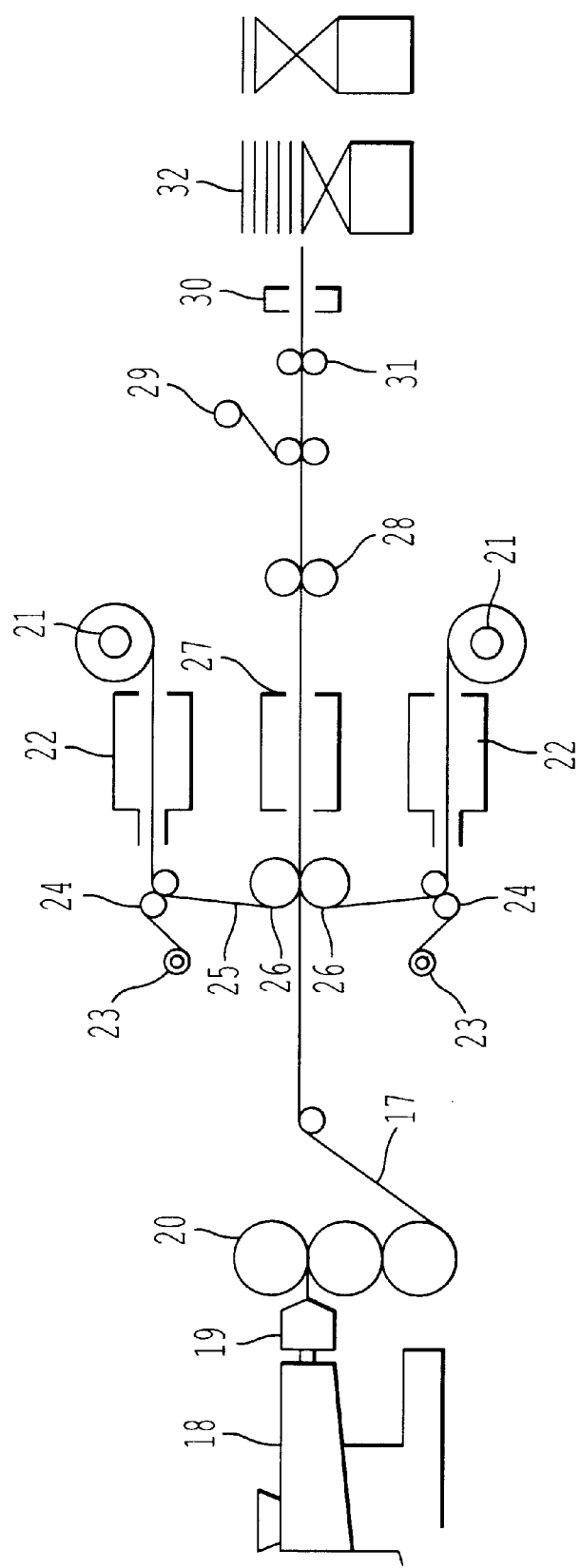
FIG. 2 illustrates an apparatus for forming the coated metal plates and coils of the present invention.

FIG. 2 schematically illustrates an apparatus used for preparing the present metal-resin composite laminates. The structure and operation of the apparatus will be discussed in terms of forming a laminate in which the resin core is sandwiched between two laminated metal sheets of the present invention. However, it is to be understood that either one of the present laminated metal sheets may be omitted or replaced with any suitable replacement such as an uncoated metal sheet. The resin core (17) is extruded through an extruder (18) through a T-die (19) and passed through a sheeting three roll set (20). The coated metal sheet is uncoiled from an uncoiler (21) and preheated in a preheater (22). The adhesive film (23) and the preheated coated metal sheet are passed through prelaminating rollers (24) to give a metal sheet-adhesive film composite (25) and the extruded resin core (17) that are then passed through the laminating rolls (26) and on through the cooler (27), by means of pulling rollers (28). An optional, protective film (29) may be applied downstream of the pulling rollers (28).

The shears (29) downstream of the pulling rollers (28) are for cutting the laminate to desired length and are preferably flying shears. The laminate may be cut to width by means of the slitter (or trimmer) (30). The finished product is collected on a piler (32).

As noted above, the coated metal sheets and metal-resin composite laminates of the present invention possess a number of desirable characteristics. The present metal sheets and laminates may be bent without peeling or cracking the reflective surface. The metal sheets may be bent as is, and the composites may be bent after scoring or cutting the metal sheet along the line of bending on the acute side of the bend. Also, because the exterior surface of both the present metal sheets and composites are composed of a cured bottom-side of the retroflective sheet, it is possible to achieve surfaces having acceptable reflective top-sides (of the same retroflective sheet) that allow for traffic safety. The completed product (the metal. sheets or metal sheet composites) meets the NCHRP 350 crash test criteria regarding motor vehicles.

Figure 3:
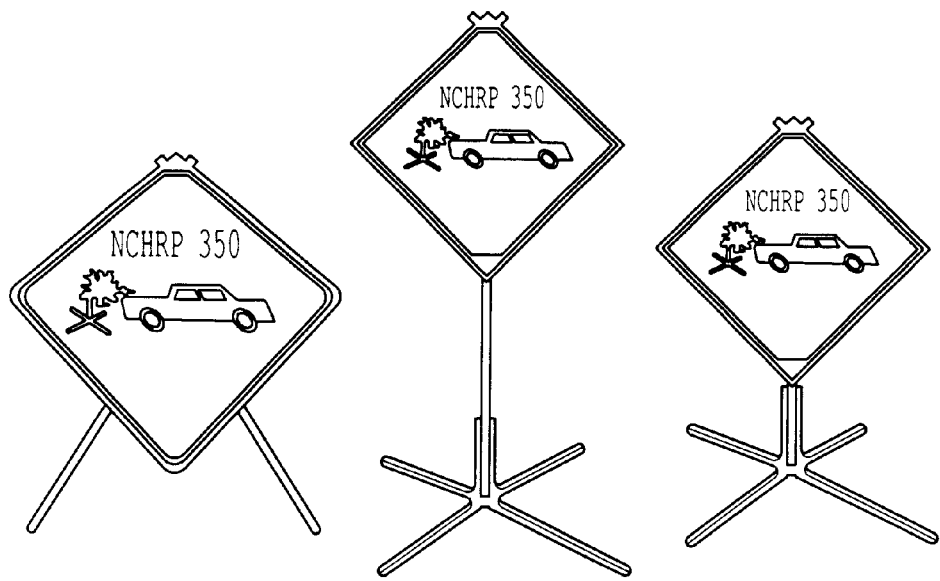
FIG. 3 illustrates various types of signs and associated stands that have been developed as working prototypes of the invention

When fabricated into highway signs, particularly portable signage, the product of the present invention is mounted onto a stand. The stand can be fixed in position or portable. Suitable stands are described in various U.S. Patents, including but not limited to U.S. Pat. Nos. 4,879,965; 4,957,258; 4,999,937; 5,197,214; 5,241,768; 4,280,294; 4,365,435; 4,403,565; 4,509,714; 4,216,932; Des. 281,513; 4,248,001; 4,493,669; 4,777,751; and 5,732,911, the relevant portions of which are hereby incorporated by reference. Examples of highway signs using the present invention product are depicted in FIG. 3.

Laminated metal composites have been shown to withstand vertical pull and 90° peel resistance tests with excellent results, as well as the results of the punch shear resistance of the laminates when subjected to an impact of as much as 4800 lbs/in$^2$.

Adhesion of the test specimens were compared with specimens using fiber reinforced plastic (FRP) as the substrate rather than the composite of the present invention. The specimens consisted of 2mm and 3 mm thick Alpolic® composite with one side laminated to either a Diamond Grade 3924F or Scotchlite CW80 Engineer Grade or Scotchlite 314R High Intensity retroflective sheeting. The composite of the present invention is preferred due to cost and ease of fabrication considerations as well as structural integrity, weight (or density), weight to strength ratio and similarity to conventional metal backed signage. Also, and perhaps more importantly, this combination has been shown to meet the requirements of the NCHRP 350 crash testing criteria, specifically Category 2.

EXAMPLE

The specimens were preconditioned at 72° F., 50% RH for 20 hours prior to testing. Adhesion was measured by peeling the specimens from the panel so that the material being removed was at 90° to the substrate. The removal rate was 12 inches per minute. Table 1 below indicates the average, maximum, and minimum adhesion values recorded for the 90° peel adhesion recorded for each Scotchlite™ sheeting from each composite substrate tested.

| Substrate | sheeting | Adhesion (lb./inch) | | |
| --- | --- | --- | --- | --- |
| | | average | max | min |
| Alpolic 2MM-LT | Diamond Grade ™ 3924F | 3.93 | 4.70 | 3.15 |
| Alpolic 3MM3WST12 | Diamond Grade ™ 3924F | ND | ND | ND |
| FRP-1 | Diamond Grade ™ 3924F | 4.96 | 5.98 | 3.92 |
| FRP-2 | Diamond Grade ™ 3924F | 5.60 | 6.52 | 4.14 |
| Alpolic 2MM-LT | Scotchlite ™ 1480 Engineer Grade | 3.24 | 3.59 | 2.49 |
| Alpolic 3MM3WST12 | Scotchlite ™ 1480 Engineer Grade | 3.07 | 3.44 | 2.68 |
| FRP-1 | Scotchlite ™ 1480 Engineer Grade | 3.01 | 3.39 | 2.30 |
| FRP-2 | Scotchlite ™ 1480 Engineer Grade | 3.11 | 3.54 | 2.50 |
| Alpolic 2MM-LT | Scotchlite ™ CW80 Engineer Grade | 7.61 | 8.53 | 6.48 |
| Alpolic 3MM3WST12 | Scotchlite ™ CW80 Engineer Grade | 7.57 | 8.61 | 6.36 |

-continued

| Substrate | sheeting | Adhesion (lb./inch) | | |
|---|---|---|---|---|
| | | average | max | min |
| FRP-1 | Scotchlite ™ CW80 Engineer Grade | 6.31 | 7.18 | 4.85 |
| FRP-2 | Scotchlite ™ CW80 Engineer Grade | 7.25 | 8.41 | 5.61 |
| Alpolic 2MM-LT | Scotchlite ™ 314R High Intensity ™ | 7.94 | 8.57 | 7.20 |
| Alpolic 3MM3WST12 | Scotchlite ™ 314R High Intensity ™ | 8.48 | 9.17 | 7.72 |
| FRP-1 | Scotchlite ™ 314R High Intensity ™ | 8.51 | 9.32 | 7.84 |
| FRP-2 | Scotchlite ™ 314R High Intensity ™ | 8.38 | 9.58 | 6.71 |
| Alpolic bare 3105 H14 aluminum with chromate conversion coating (Mill A) | Diamond Grade ™ 3924F | 7.61 | 8.51 | 6.38 |
| Alpolic bare 3105 H14 aluminum with chromate conversion coating (Mill C) | Diamond Grade ™ 3924F | 9.38 | 10.38 | 8.44 |
| 6061 T6 aluminum, chromate | Diamond Grade ™ 3924F | 6.51 | 7.57 | 5.36 |
| 5052H38 aluminum, etch & desmut | Diamond Grade ™ 3924F | 7.20 | 8.36 | 6.00 |

As Table 1 indicates, the adhesion was best for Scotchlite 1480 and CW80 Engineering Grade sheetings to Alpolic 2MM-LT. For both temporary and permanent sign installations, this combination performed well. Uncoated (chromated surface only) aluminum surfaces perform even better in these adhesion tests. If the polymeric coating is not applied the aluminum surfaces are chromated. The uncoated aluminum surface oxidizes and forms aluminum oxides as well as aluminum hydroxides, to which a hexavalent chromium salt can attach. A chromium salt solution (bath) (preferably BETZ 1500 Chromate solution, available from Betz Corporation) is used to activate the aluminum surface to provide proper adhesion and homogeneous application of coatings or sheeting to the aluminum surface. Not only does this coating promote bonding or adhesion, but it also inhibits further corrosion of the aluminum surface. An air knife or doctor blade is used to control the thickness of this coating of the salt solution. The coating is dried in place at a temperature of 400–500° F. using a convection oven.

Obviously, numerous modifications and variations of the present invention are possible in light of the above teachings. It is therefore to be understood that within the scope of the appended claims, the invention may be practiced otherwise than as specifically described herein.

What is claimed is:

1. A metal-resin composite laminated metal sheet comprising:
   a resin sheet having two metal sheets laminated one on each side thereof, and
   wherein at least one of said metal sheets is a retroflective surfaced metal sheet; wherein said retroflective surfaced metal sheet comprises;
   a metal substrate having an interior and exterior surface with said interior surface adhered to said resin sheet; and
   a retroflective sheeting adhered to said exterior surface of said metal substrate by a layer of adhesive;
   wherein said metal-resin composite laminated sheet has rigidly to pass the NCHRP 350 crash test for use as a highway sign.

2. The composite of claim 1, wherein said metal substrate is selected from the group consisting of aluminum, iron, copper, tin, and steel.

3. The composite of claim 1, wherein said metal substrate is aluminum or an aluminum alloy.

4. The composite of claim 1, wherein said resin sheet has a thickness of 1 to 10 mm.

5. The composite of claim 1, wherein said metal-resin composite laminated metal sheet has a total thickness in the range of 0.079–0.157 inches (2–4.4 mm).

6. The composite of claim 1, wherein said resin sheet comprises a resin selected from the group consisting of polyethylene, polypropylene, polybutene, polyvinyl chloride, polystyrene, polyamide, polyethylene terephthalate, polybutylene terephthalate, and polycarbonate.

7. The composite of claim 1 wherein said resin sheet comprises polyethylene, said polyethylene containing carbon black in the range of 1–3 wt %.

8. The composite of claim 1, wherein said retroflective surfaced metal sheet further comprises a layer of a polymeric resin between said metal substrate exterior surface and said retroflective sheeting.

9. The composite of claim 8, further comprising a layer of primer between said layer of polymeric resin and said retroflective sheeting.

10. The composite of claim 8, wherein said metal substrate is selected from the group consisting of aluminum, iron, copper, tin, and steel.

11. The composite of claim 8, wherein said metal substrate is aluminum or an aluminum alloy.

12. The composite of claim 8, wherein said resin sheet has a thickness of 1 to 10 mm.

13. The composite of claim 8, wherein said metal-resin composite laminated metal sheet has a total thickness in the range of 0.079–0.157 inches (2–4.4 mm).

14. The composite of claim 8, wherein said resin sheet comprises a resin selected from the group consisting of polyethylene, polypropylene, polybutene, polyvinyl chloride, polystyrene, polyamide, polyethylene terephthalate, polybutylene terephthalate, and polycarbonate.

15. The composite of claim 14, wherein said resin sheet comprises polyethylene, said polyethylene containing carbon black in the range of 1-3 wt%.

16. The composite of claim 8, further comprising a layer of a polymeric resin between said metal substrate interior surface and said resin sheet.

17. The composite of claim 1, wherein said layer of adhesive is the only layer between said metal substrate exterior surface and said retroflective sheeting.

18. The composite of claim 17, wherein said metal substrate is selected from the group consisting of aluminum, iron, copper, tin, and steel.

19. The composite of claim 17, wherein said metal substrate is aluminum or an aluminum alloy.

20. The composite of claim 17, wherein said resin sheet has a thickness of 1 to 10 mm.

21. The composite of claim 17, wherein said metal-resin composite laminated metal sheet has a total thickness in the range of 0.079–0.157 inches (2–4.4 mm).

22. The composite of claim 17, wherein said resin sheet comprises a resin selected from the group consisting of polyethylene, polypropylene, polybutene, polyvinyl chloride, polystyrene, polyamide, polyethylene terephthalate, polybutylene terephthalate, and polycarbonate.

23. The composite of claim 17, wherein said resin sheet comprises polyethylene, said polyethylene containing carbon black in the range of 1–3 wt %.

24. The composite of claim 1, wherein both of said two metal sheets are retroflective surfaced metal sheets.

25. The composite of claim 24, wherein one of said retroflective surfaced metal sheets has a layer of polymeric resin between said metal substrate exterior surface and said retroflective sheeting, and the other of said retroflective surfaced metal sheets is without said layer of polymeric resin.

26. The composite of claim 8, wherein both of said two metal sheets are retroflective surfaced metal sheets.

27. The composite of claim 26, wherein both of said retroflective surfaced metal sheets has a layer of polymeric resin between said metal substrate exterior surface and said retroflective sheeting.

28. The composite of claim 17, wherein both of said two metal sheets are retroflective surfaced metal sheets.

* * * * *